April 25, 1944.  G. V. RYLSKY  2,347,218
LIQUID LEVEL
Filed Sept. 3, 1942
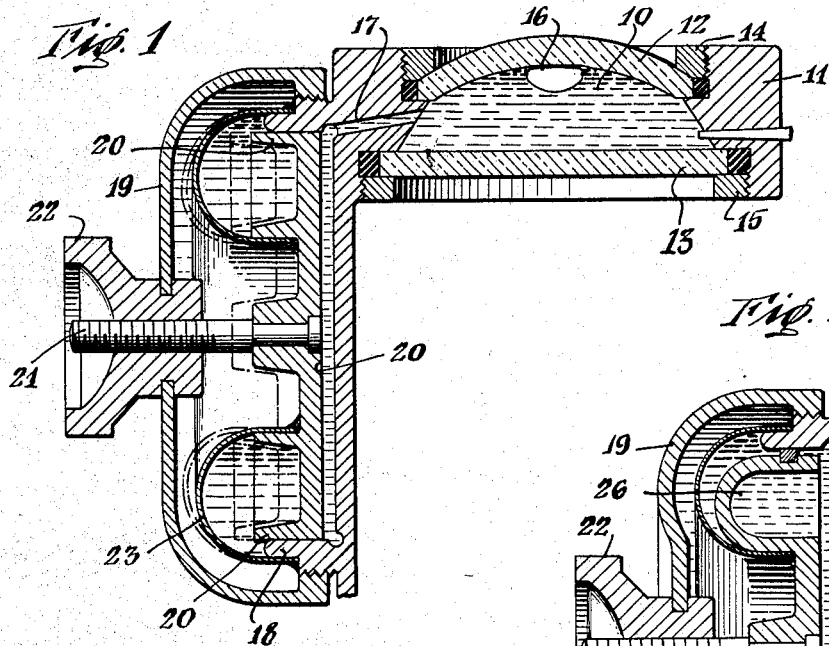
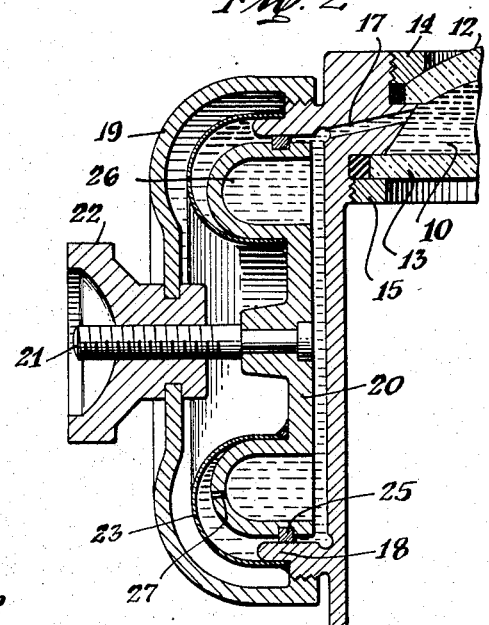
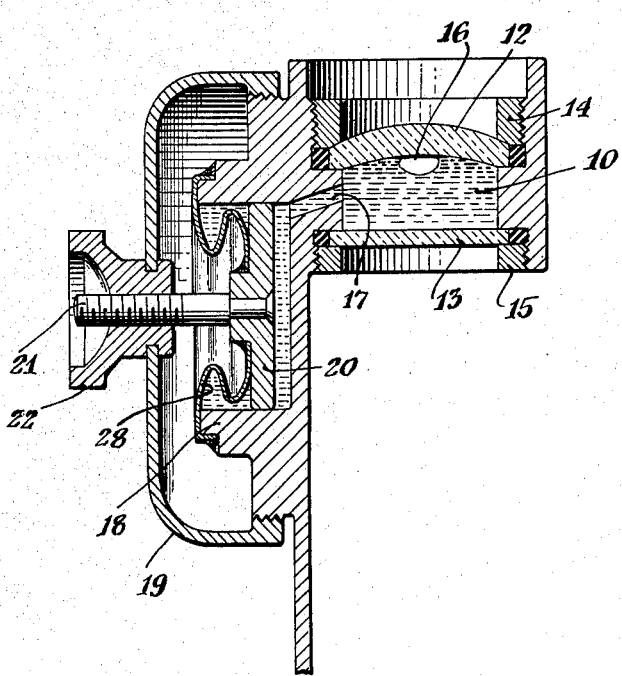
INVENTOR.
G. V. Rylsky
BY
ATTORNEY Patented Apr. 25, 1944

2,347,218

UNITED STATES PATENT OFFICE 2,347,218

LIQUID LEVEL

Gregory V. Rylsky, New York, N. Y., assignor to Bendix Aviation Corporation, Bendix, N. J., a corporation of Delaware Application September 3, 1942, Serial No. 457,215

8 Claims. (Cl. 33—212)

The present invention relates to liquid levels adapted for use in sextants, octants, range finders and other instruments wherein it is desired to provide an artificial horizon by means of a bubble, and more particularly to means for forming and adjusting the size of a bubble.

It is well known that in precision instruments of the above type in which a sealed bubble vessel is used, the size of the bubble varies due to expansion and contraction of the liquid in the vessel due to temperature change.

Devices for adjusting the size bubbles within bubble vessels have been provided, heretofore, which comprise diaphragms or flexible members of like nature. These devices, because they were subject to the full adjustment force necessary to form and adjust the size of a bubble, would rupture prematurely and thus destroy the necessary seal required for proper operation.

An object of the present invention, therefore, is to provide a bubble vessel with novel and durable means for forming and adjusting the size of a bubble within the vessel.

Another object of the invention is to provide novel bubble forming and adjusting means for a bubble vessel comprising mainly, a cylinder and piston arrangement for forcing liquid into and out of the bubble chamber.

A further object of the invention is to provide novel bubble forming and adjusting means for a bubble vessel comprising a cylinder and piston arrangement together with a resilient member interconnecting the piston and cylinder to define a variable volume reservoir communicating with the bubble vessel for forcing liquid into and out of the vessel.

The above and other objects and advantages of the invention will appear more fully hereinafter from a consideration of the detailed description which follows taken together with the accompanying drawing wherein several embodiments of the invention are illustrated. It is to be expressly understood, however, that the drawing is for the purpose of illustration only and is not to be construed as a definition of the limits of the invention.

In the drawing wherein like reference characters refer to like parts throughout the several views, Figure 1 is a vertical longitudinal section taken through one form of liquid level embodying the present invention;

Figure 2 is a view similar to that of Figure 1, illustrating a second embodiment of the present invention; and, Figure 3 is a view similar to the foregoing views, illustrating a further embodiment of the invention.

Referring now to the drawing, and more particularly to Figure 1 thereof, the liquid level, as shown, comprises a bubble chamber 10 formed by a cylindrical vessel 11, a top lens 12 and a bottom lens 13, together with retaining rings 14 and 15 for urging the lenses into contact with suitable abutments formed in the cylindrical vessel. If desired, conventional sealing rings may be provided between lenses 12 and 13 and the vessel 11 to provide an efficient seal for the liquid level.

The novel means of the invention are now provided for forming and adjusting the size of a bubble 16 within the bubble chamber and, to this end, the bubble chamber is connected by means of a passage 17 with a cylinder 18, which is formed integrally with vessel 11 or otherwise suitably secured thereto. The outer periphery of cylinder 18 is threaded for receiving a cup-shaped member or housing 19. The inner periphery of the cylinder is highly polished and receives for reciprocal movement therein a piston 20.

Piston 20 is rigidly secured to a threaded rod 21 which, in turn, is adapted for rotation in one direction or another by means of a suitable adjusting knob 22 mounted within an opening provided for that purpose within housing 19. The piston, furthermore, has a given desirable depth so as to provide for itself a slight guiding action within the cylinder.

A flexible cover or boot 23 preferably constructed of thin metal, which may be spun from sheet metal, is connected at one of its ends in any suitable manner, such as, by soldering, for example, to cylinder 18 and at its other end to piston 20. Some clearance necessarily exists between piston 20 and cylinder 18 so that liquid from cylinder 18 will be present as well within the chamber defined by the flexible boot. This connection of the cylinder and piston with the flexible boot provides a variable volume liquid reservoir efficiently sealed off from the interior of housing 19 and connected for communication with the bubble chamber. Furthermore, with the foregoing novel arrangement, it is obvious that the full adjustment force exerted by knob 22 is expanded upon piston 20 so that the principal function of boot 23 is to seal off cylinder 18 from housing 19.

Initially, bubble chamber 10, cylinder 18 and the interior of boot 23 are wholly filled with suitable liquid. In order to generate a bubble within the bubble chamber, knob 22 is rotated to move piston 20 outwardly relative to cylinder 18 to release the pressure within the bubble chamber and the cylinder. The bubble will appear at the point where the pressure will have a minimum value and this will be to the right of the piston. The air bubble will travel upwardly through passage 17 into the bubble chamber. The size of the bubble obviously may be varied by adjusting the knob additionally to further reduce or increase pressure within the bubble chamber.

A slightly modified form of the present invention is provided for performing substantially the same purpose and operation as above described and, as illustrated in Figure 2, comprises a piston 20 provided with a piston ring 25 providing a seal between the piston and cylinder. The piston, itself, instead of the generally flat operative surface shown in Figure 1, is provided with an annular chamber 26. In order to release the pressure within cylinder 18 during movement of the piston, the latter is provided with a restricted orifice 27 communicating cylinder 18 through annular chamber 26 with the chamber formed by flexible boot 23. Except for the foregoing minor changes, the method of producing a bubble and adjusting its size within the bubble chamber is the same as that set forth in connection with the structure of Figure 1.

Figure 3 illustrates a still further embodiment of the invention wherein the structure shown is substantially the same as that of the preceding figures except that in place of the flexible boot 23 for joining the piston with the cylinder, a flexible cover 28 is provided which may have one or more folds in the nature of a Sylphon. The operation of this structure, as will be apparent, is similar to that described in connection with Figures 1 and 2.

As previously pointed out, with the bubble chamber, cylinder and boot or Sylphon completely filled with liquid, a bubble will appear upon outward movement of piston 20 at the point of the liquid where the pressure is of a minimum value. This uneven distribution of pressure will exist while the piston is in motion and the liquid is in a dynamic state.

The distribution of pressure during outward piston motion is such that within the chamber formed by the flexible boot or Sylphon member the pressure will increase and the amount of increase will depend upon the leakage between the piston and cylinder of Figures 1 and 3 or the orifice 27 of Figure 2. The pressure within the bubble chamber will decrease and the change will depend upon the clearance of passage 17. The greatest pressure change occurs within cylinder 18 to the right of piston 20 at a point furthest removed from passage 17 and the leakage clearance between the cylinder and the chamber formed by the flexible cover. Such a point is one located substantially at the corner of the piston face. Hence, a bubble will appear within the cylinder at the point indicated and nowhere else.

The chamber defined by the flexible boot or the Sylphon member represents a third chamber wherein, during a dynamic state of the system, the pressure change will be of an opposite value to that within the cylinder and the bubble chamber. A bubble, however, will never be generated behind the piston because even though the existing bubble within the bubble chamber is being compressed, the pressure within the boot or Sylphon chamber will never be low enough to permit a bubble to form therein.

There is thus provided a liquid level with novel bubble forming and adjusting means which are durable in construction and simple and rapid in operation.

While several embodiments of the present invention have been illustrated and described in detail, it is to be expressly understood that the invention is not limited thereto. Various changes may be made in the design and arrangement of the parts without departing from the spirit and scope of the invention as will now be understood by those skilled in the art. For a definition of the limits of the invention, reference will be had primarily to the appended claims.

I claim:

1. A liquid level comprising a bubble chamber, a reservoir defining a cylinder one end of which communicates with said bubble chamber, an actuating piston for said cylinder, and a flexible sealing member interconnecting said piston and the opposite end of said cylinder and constituting a part of said reservoir.

2. A liquid level comprising a bubble chamber, a reservoir defining a cylinder one end of which communicates with said bubble chamber, a piston mounted for movement within said cylinder, a resilient sealing member connecting said piston and the opposite end of said cylinder and constituting a part of said reservoir, and means for actuating said piston.

3. A liquid level comprising a bubble chamber, a reservoir defining a cylinder, means providing a passage between one end of said cylinder and said bubble chamber, a piston mounted for movement within said cylinder, a resilient cover sealably joining the opposite end of said cylinder with said piston and constituting a part of said reservoir, and rotatable means for actuating said piston.

4. A liquid level comprising a bubble chamber, a reservoir defining a cylinder one end of which communicates with said bubble chamber, a piston mounted for movement within said cylinder, a sealing ring carried by said piston for cooperation with said cylinder, a resilient member connecting said piston with the opposite end of said cylinder and constituting a part of said reservoir, and means providing restricted communication between said cylinder and said resilient member.

5. A liquid level comprising a bubble chamber, a housing, a cylinder within said housing and having one end thereof in communication with said bubble chamber, a piston mounted for movement within said cylinder, a flexible sealing cover connecting said piston with the opposite end of said cylinder and forming a part of said reservoir whereby said cylinder forms a reservoir closed off from said housing and communicating with said bubble chamber, and means for actuating said piston.

6. An adjustable liquid level comprising a bubble chamber, a reservoir defining a cylinder one end of which communicates with said bubble chamber, a liquid within said bubble chamber and said reservoir and forming a bubble within said bubble chamber, a piston mounted for movement within said cylinder, a flexible sealing member connecting said piston to the opposite end of said cylinder and forming a part of said reservoir, and rotatable means for actuating said piston to force the liquid contained within said cylinder into and out of said bubble chamber whereby the size of the bubble is varied.

7. A liquid level comprising a bubble chamber, a reservoir defining a cylinder one end of which communicates with said bubble chamber, a piston mounted for movement within said cylinder, a flexible metal boot interconnecting said piston to the opposite end of said cylinder and forming a part of said reservoir, and a rotatable knob for actuating said piston.

8. A liquid level comprising a bubble chamber, a reservoir defining a cylinder one end of which communicates with said bubble chamber, a piston adapted for movement within said cylinder, a flexible Sylphon member connecting said piston with the opposite end of said cylinder and forming a part of said reservoir, and means for actuating said piston.

GREGORY V. RYLSKY.